(12) United States Patent
Jordan et al.

(10) Patent No.: US 6,264,008 B1
(45) Date of Patent: Jul. 24, 2001

(54) PARALLEL-PUSH BRAKE MECHANISM FOR BICYCLES

(75) Inventors: Brian T. Jordan; Michael P. Johnson; Ryan A. Calilung; John D. Cheever; Sanjeev K. Mankotia, all of Chicago; Kevin F. Wesling, Lombard, all of IL (US)

(73) Assignee: Sram Corporation, Chicago, IL (US)

( * ) Notice: Subject to any disclaimer, the term of this patent is extended or adjusted under 35 U.S.C. 154(b) by 0 days.

(21) Appl. No.: 09/289,302

(22) Filed: Apr. 9, 1999

(51) Int. Cl.[7] ....................................................... B62L 3/00
(52) U.S. Cl. .................... 188/24.22; 188/24.19; 188/24.21
(58) Field of Search ............................... 188/24.22, 24.12, 188/24.15, 24.16, 24.21, 24.19

(56) References Cited

U.S. PATENT DOCUMENTS

| | | | |
|---|---|---|---|
| 5,501,301 | * 3/1996 | Nishimura | 188/24.19 |
| 5,636,716 | * 6/1997 | Sugimoto et al. | 188/24.22 |
| 5,655,630 | * 8/1997 | Sugimoto | 188/24.22 |
| 5,743,284 | * 4/1998 | Lumpkin | 188/24.22 |
| 5,775,466 | * 7/1998 | Banyas et al. | 188/24.21 |
| 5,913,387 | * 6/1999 | Yamashita et al. | 188/24.21 |
| 5,913,388 | * 6/1999 | Ota et al. | 188/24.22 |
| 5,960,913 | * 10/1999 | Kuo | 188/24.19 |
| 6,089,356 | * 7/2000 | Ohta et al. | 188/24.21 |
| 6,109,397 | * 8/2000 | Chen | 188/24.22 |

* cited by examiner

Primary Examiner—Robert J. Oberleitner
Assistant Examiner—Benjamin A. Pezzlo
(74) Attorney, Agent, or Firm—Milan Milosevic; Jefferson Perkins; Piper Marbury Rudnick & Wolfe

(57) ABSTRACT

A parallel-push brake assembly for bicycles that provides substantially translational motion of the brake pad using a mechanism that is relatively free of tolerance build-up or slop.

29 Claims, 15 Drawing Sheets

PARALLEL-PUSH BRAKE MECHANISM FOR BICYCLES

TECHNICAL FIELD OF THE INVENTION

This invention relates generally to bicycle brake mechanisms, and more particularly to brake mechanisms exhibiting substantially translational motion during brake actuation.

DESCRIPTION OF RELATED ART INCLUDING INFORMATION DISCLOSED UNDER 37 CFR 1.97 AND 37 CFR 1.98

Bicycle brake assemblies commonly employ a pair of cantilevered brake arms that are pivotally mounted to a bicycle frame. FIG. 1 depicts a typical cantilever brake assembly wherein a brake arm 10 is pivotally attached to a bicycle frame member (not shown) at a pivot 12 and actuated by a cable or hydraulic line at a remote point 14 by a force A. A brake pad carrier 16 is attached to the brake arm 10 at one end and has a brake pad or shoe 18 attached at its other end. Upon rotation of the brake arm 10 in a clockwise direction, the brake pad 18 is swept along an arched path B until the pad contacts a rim 20. So configured, the brake pad will exhibit "brake dive" during actuation as the contact surface 20 of the brake pad 18 not only rotates but also drops toward the bottom of the rim 20, resulting in a single point of contact with the rim and reduced braking performance. Under continued use, the pad thickness is reduced thereby exacerbating the brake dive problem and in some cases resulting in a portion of the pad 20 falling below the rim thereby further reducing braking performance.

Maximum braking force is obtained by parallel, straight-line application of the brake pads to the rim as shown in FIG. 2. Such a "pure parallel-push" brake pad application is exhibited by the piston-type brake assembly described in U.S. Pat. No. 5,775,466 issued to Banyas. Such brake assemblies, however, tend to "chatter" as the piston binds within the housing through which it displaces upon brake pad contact with the rim. Other brake assemblies include brake carriers 16 that are pivotally attached to the brake arm 10 and mechanisms linking the brake carrier 16 to the bicycle frame that ensure that the pad face 20 remains parallel to a contact surface 58 of the rim 20 as the brake arm 10 is actuated. In such "arched parallel-push" systems as shown in FIG. 3, the pad 18 may still exhibit some drop, but this can be minimized by designing the brake arm 10 such that the brake pad 18 sweeps along the top of arc B, thereby still providing very powerful braking. U.S. Pat. No. 5,636,716 issued to Sugimoto employs one type of arched parallel-push motion. However, the mechanism used to maintain the brake carrier in the correct attitude in the Sugimoto patent involves a complex 4-bar/4-pin parallelogram linkage that has a substantial amount of inherent tolerance build-up or slop, resulting in brakes "squealing" during actuation.

SUMMARY OF THE INVENTION

It is the object of the invention to provide a parallel-push brake assembly that provides substantially translational motion of the brake pad using a simple mechanism that is relatively free of tolerance build-up.

According to one aspect of the invention, a brake assembly includes a brake arm pivotally connected to a bicycle frame member at a pivot. A brake pad assembly is pivotally connected to the brake arm at an axis spaced from the pivot, the brake pad assembly including a brake pad. Either a cam surface or a follower surface is made a part of the brake pad assembly, while the other of a follower surface or a cam surface is affixed relative to the bicycle frame member. The cam surface and the follower surface are in engagement with each other such that upon actuation of the brake arm to pivot around the pivot, the follower surface tracks along the cammed surface. Preferably, the follower surface and the cam surface translate the arcuate motion of the brake arm to a substantially translational trajectory of the brake pad, although other desired motions of the brake pad can be had upon modification of the shape of the cams or cam followers.

According to another aspect of the invention, the first and second engagement surfaces on the brake pad assembly and as affixed to the bicycle frame member, respectively, are connected together using an interconnect member. This interconnect member can be in rolling engagement with the first and second engagement surfaces. In one embodiment, the interconnect member is a chain, and the first and second engagement surfaces are geared to receive the chain. In another embodiment, the interconnect member is a further gear which engages those geared surfaces. The interaction of the first and second engagement surfaces with the interconnect member modifies the arcuate motion of the brake arm to produce a different motion in the brake pad. In the illustrated embodiment, this brake pad motion is substantially translational, although other paths of the brake pad can be devised by suitable modification of the shapes and locations of the first and second engagement surfaces and the member interconnecting them.

In another embodiment of the invention, the brake pad attachment member is pivotally attached to a slot located in the brake arm, the slot being configured to permit sliding adjustment of the brake pad attachment member in order to tension the flexible interconnect member.

In yet a further embodiment of the invention, a first slot is disposed on a first one of the brake pad attachment member and the urging member. A first pin is disposed on a second one of the brake pad attachment member and the urging member, the pin and the slot being configured such that upon actuation of the brake arm, the pin slides along the first slot, thereby causing the brake pad to be displaced along a predetermined trajectory. The predetermined trajectory can be translational or it can take another predetermined path.

In yet another aspect of the invention, first and second tension-only carrying members are each pivotally connected to the brake pad attachment member and the urging member. The pivotal connections of the tension-only carrying members are disposed on the brake pad attachment member and the urging member, such that upon actuation of the brake arm, the brake pad is displaced along a predetermined trajectory. It is preferred although not required that this predetermined trajectory be translational.

BRIEF DESCRIPTION OF THE DRAWINGS

Further aspects of the invention and their advantages will be discerned with reference to the appended drawings, in which like characters identify like parts and in which.

DETAILED DESCRIPTION OF ILLUSTRATED EMBODIMENT

Figure 1:
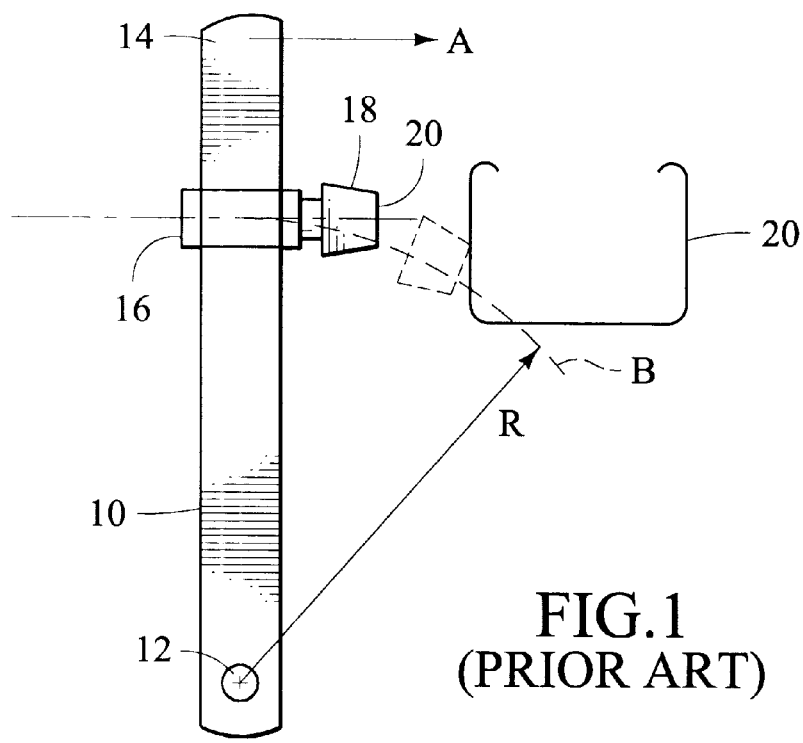
FIG. 1 is a schematic of a conventional brake assembly according to the prior art.

FIGS. 4–8 describe first and second cammed embodiments of the invention. A brake arm 10 is pivotally connected about axis or pivot X to a bicycle frame member 22 at a brake boss 28 and to a control cable 24 or a hydraulic line at a remote end 26 where an actuation force A is applied. Alternatively, other means, such as a force acting through a rotating brake boss (not shown) could make the brake pivot arm 10 pivot; the source of the pivoting motion is not central to the invention. A brake pad attachment member 30 is pivotally connected to the brake arm 10 about axis Y and has a brake shoe or pad 32 attached thereto at a distal end facing a rim 34 of a bicycle wheel. The axis Y is spaced from arm pivot axis X. An urging or cam follower member 36 is fixed relative to frame member 22. The brake pad attachment member 30 includes a cam surface 38 in bearing engagement with a follower surface 40 disposed on the urging member 36. While in the illustrated embodiment the brake pad 32, brake pad attachment member 30 and cam surface 38 are made of different components which are assembled together, one or more of them could be integrated into another of them. Cam surface 38 includes first and second convexly arcuate cam surface segments 42 and 44, which are substantially of the same shape. Likewise, follower surface 40 includes first and second follower surface segments 46 and 48 in bearing engagement with cam surface segments 42 and 44, respectively.

Figure 4:
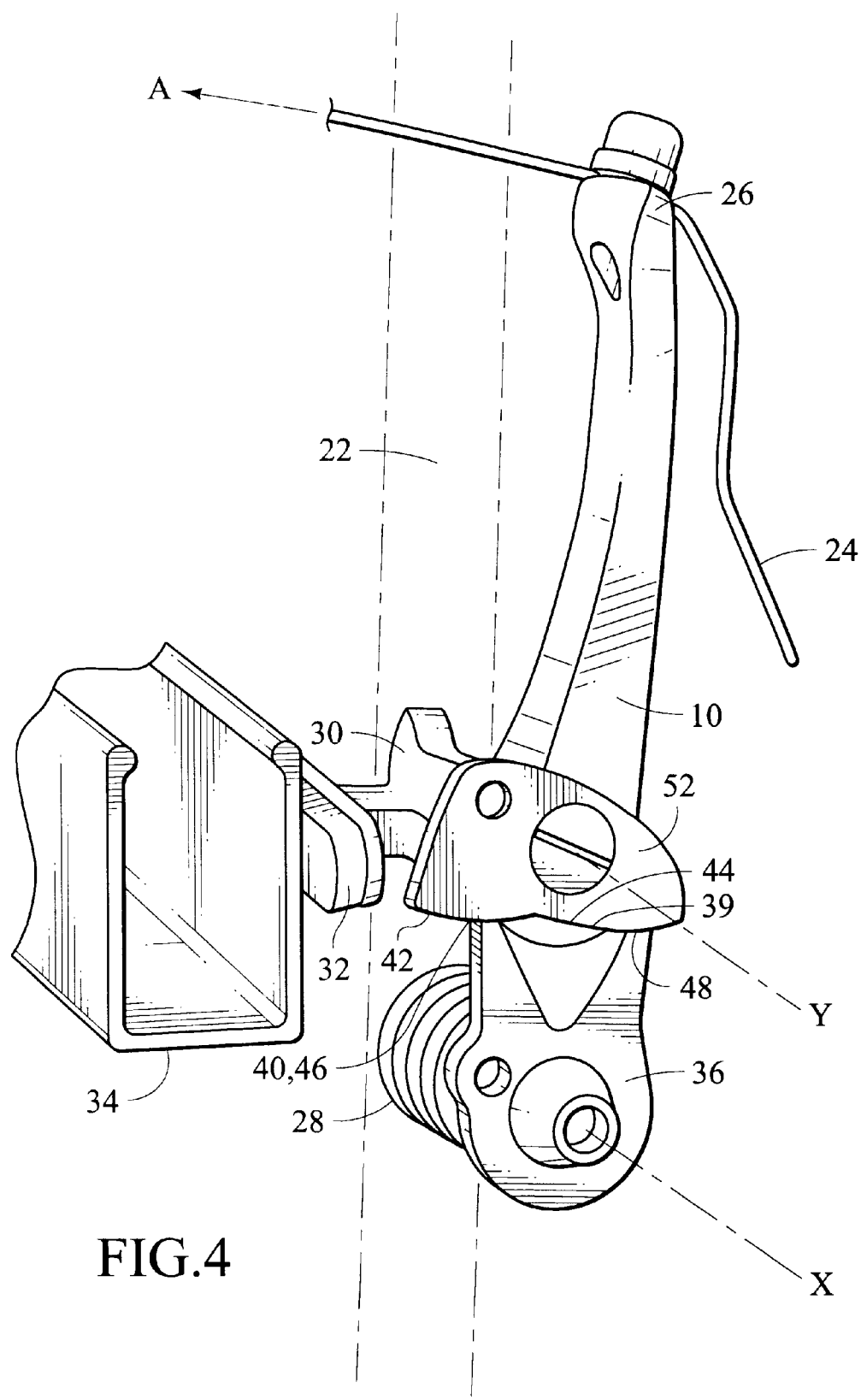
FIG. 4 is a perspective view of a first cammed embodiment of the invention.
Figure 6:
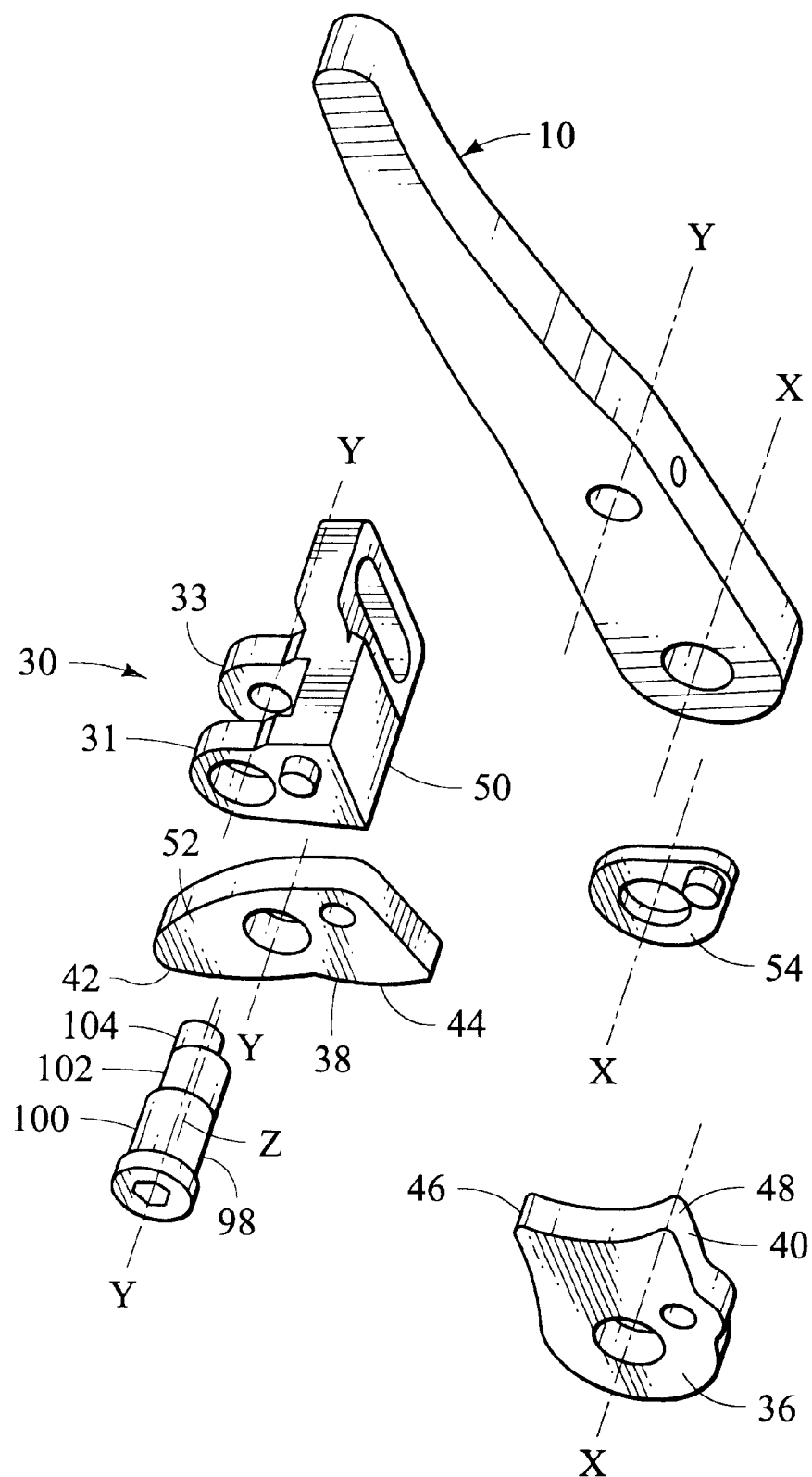
FIG. 6 is an exploded view of the components making up the embodiment of FIG. 4.

FIG. 6 is an exploded view of the components making up the embodiment of FIG. 4. As shown, the brake pad attachment member 30 is divided into two components, a pad receiver 50 and a cam element 52, the cam element being rigidly connected to the pad receiver. The brake pad attachment member 30 is hinged to the brake arm 10 about axis Y with first and second legs 31, 33, respectively, straddling the brake arm 10. A cylindrical plug 98 connects the brake pad attachment member 30 to the brake arm 10, along the central axis Y. The plug 98 further serves as an adjustment device to precisely position the cam surface 38 onto the follower surface 40. The plug 98 is comprised of three segments 100, 102, and 104, with first plug segment 100 and third plug segment 104 sharing the central axis Y, while second plug segment 102 has a central axis Z that is offset from axis Y. With the plug 98 installed, first plug segment 100 engages first leg 31, third plug segment 104 engages second leg 33, and second plug segment 102 engages the brake arm 10. Accordingly, rotating the plug 98 about axis Y permits the entire brake pad attachment member 30 to be shifted relative to the brake arm 10, thereby precisely positioning cam surface 38 onto the follower surface 40. The plug 98 can be locked into the desired position relative to the brake arm 10 with a setscrew (not shown). Additionally, a fixing element 54 rigidly connects the urging member 36 to the frame 22. Preferably, surface 42 and 44, and 46 and 48 are fashioned to have low coefficients of friction; for example, cam 52 and urging member 36 can be made of DELRIN®.

Figure 5:
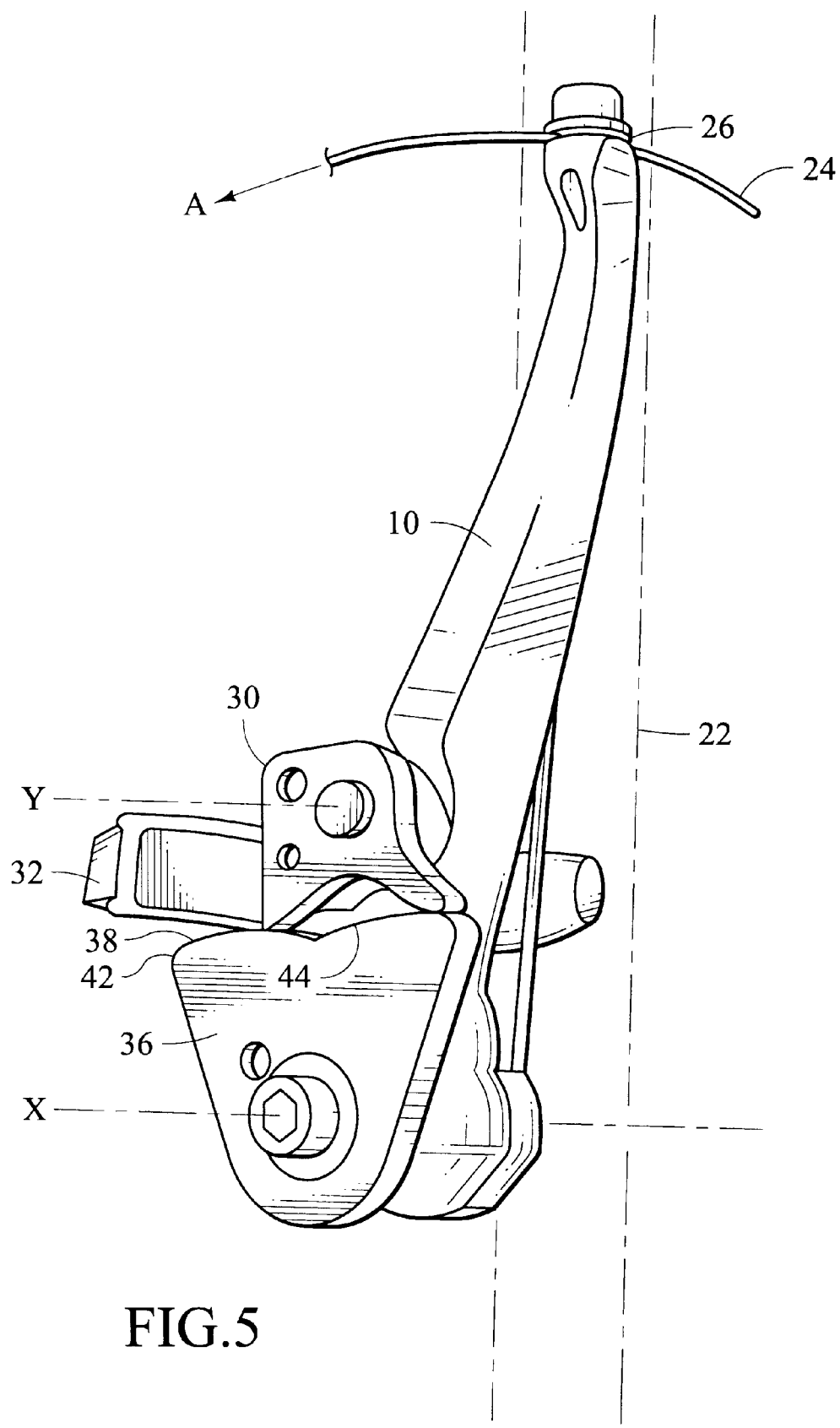
FIG. 5 is a perspective view of a second additional cammed embodiment of the invention.

In the embodiment of FIG. 5, the locations of the cam surface 38 and the follower surface 40 are merely interchanged, with the follower surface shown on the brake pad attachment member 30 and the cam surface disposed on the urging member 36 to achieve substantially the same parallel-push motion.

Figure 8:
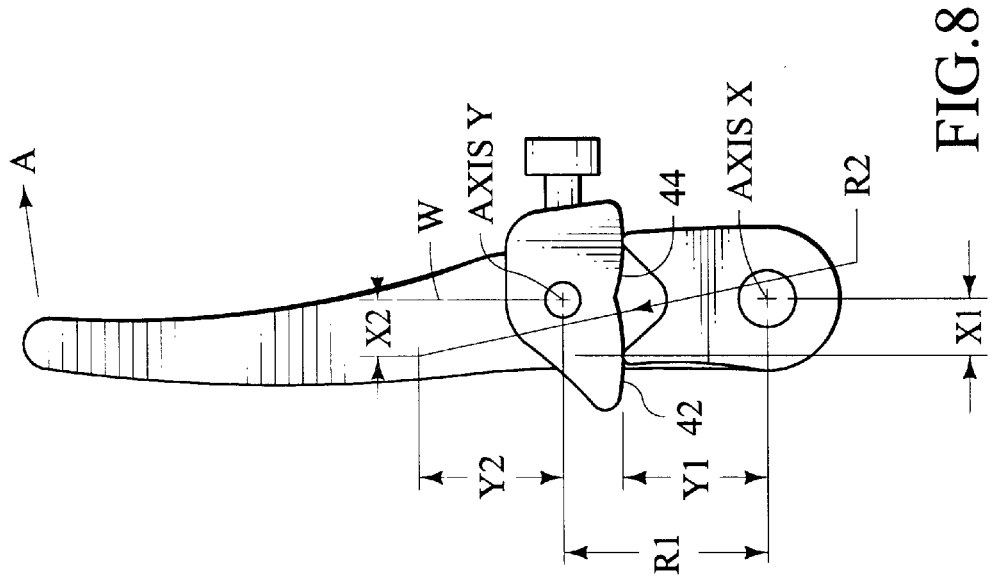
FIG. 8 is a front view of the embodiment of FIG. 4.
Figure 7:
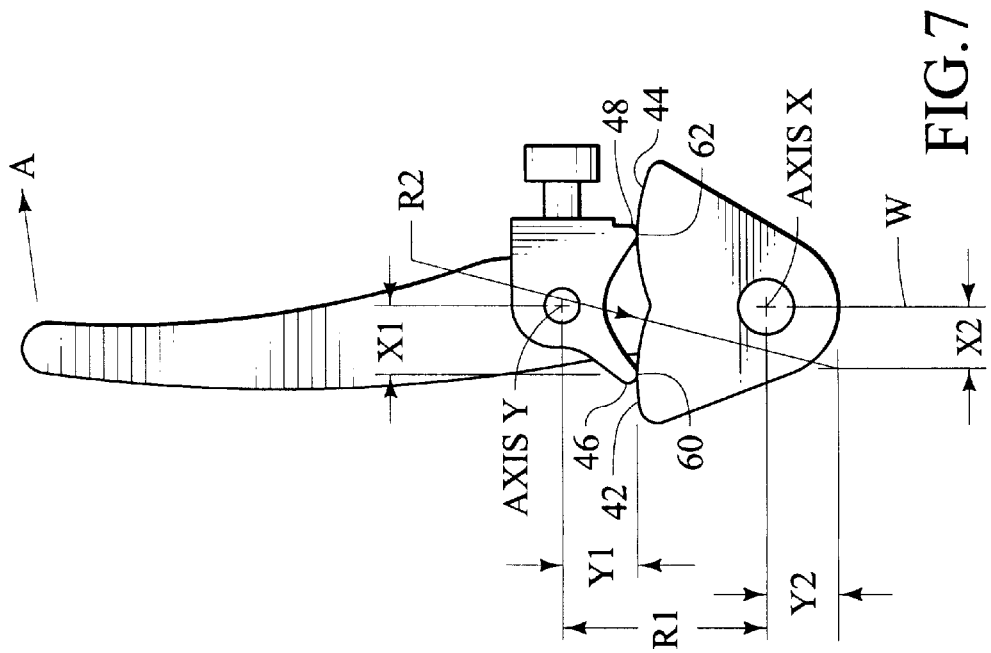
FIG. 7 is a front view of the embodiment of FIG. 5.

FIGS. 7–8 describe how to form the cam surface segments 42, 44 for both illustrated cammed embodiments of the invention. Dimensions X1, Y1, and R1 are used to locate and size the radius of the first cam surface segment 42. Accordingly, X1=X2, Y1=Y2, and R1=R2, where line W is a vertical datum connecting Axis X and Y, X1 is the horizontal distance to a first contact point 60 between the first cam surface 42 and the first follower surface 46 (a second contact point 62 is located symmetrically about line W), Y1 is the vertical distance between Axis Y and the first contact point 60, and R1 is the vertical distance between axes X and Y. The radius of the first cam surface 42 is defined by R2, the centerpoint of radius R2 being located with respect to Axis X by horizontal and vertical dimensions X2 and Y2, respectively. Second cam surface segment 44 is preferably a mirror image of the first cam surface segment 42 about line W.

Figure 2:
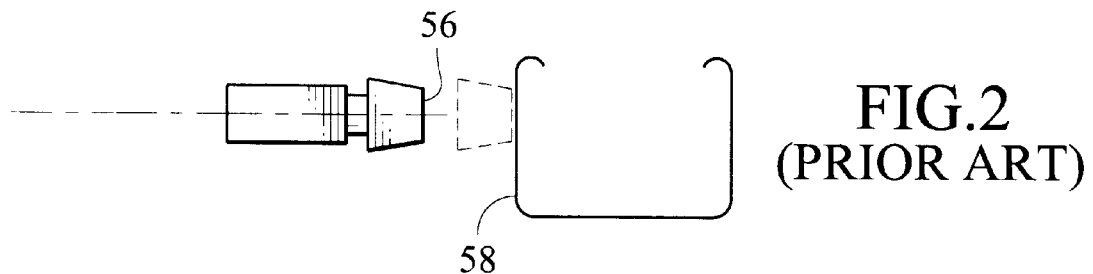
FIG. 2 is a schematic of pure parallel-push brake pad motion according to the prior art.
Figure 3:
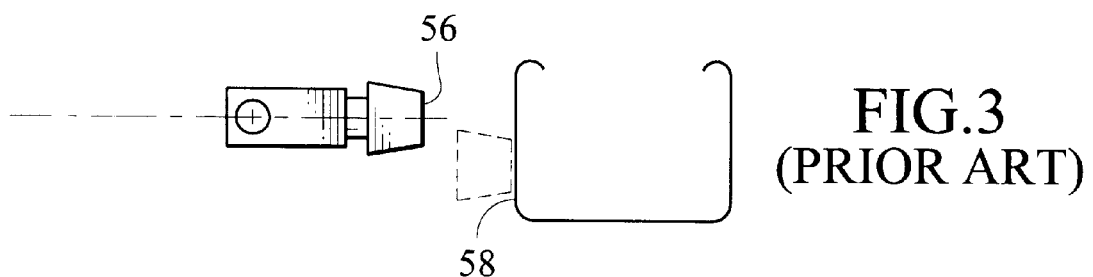
FIG. 3 is a schematic of arched parallel-push brake pad motion according to the prior art.

A cycle of operation of the first canned embodiment will now be described. Upon actuation of brake arm 10 by the control cable 24, brake arm 10 pivots about the axis X causing the axis Y to displace along an arcuate path toward the rim 34. As the brake arm 10 is deflected, the follower surface segments 46, 48 track along the cam surface segments 42, 44, respectively, to pivot the brake pad attachment member 30 about the axis Y sufficiently so as to cause the brake pad 32 to displace in a substantially translational trajectory. Pure translational motion, as shown in FIG. 2, is herein defined to mean that a brake pad contact surface 56, at any particular instant, is maintained parallel to a rim contact surface 58 and moves in a straight line orthogonal to the rim surface 58, resulting in the same contact footprint of the pad surface 56 onto rim surface 58, regardless of the reduction in pad thickness due to pad wear. In substantially translational motion, the pad contact surface 56 is likewise maintained parallel to the rim contact surface 58, but there is a minimal amount of vertical drop of pad 32 due to the arched motion of brake arm 10, thereby still maintaining substantially the same pad footprint on the rim surface 58 with decreasing pad thickness.

Figure 9:
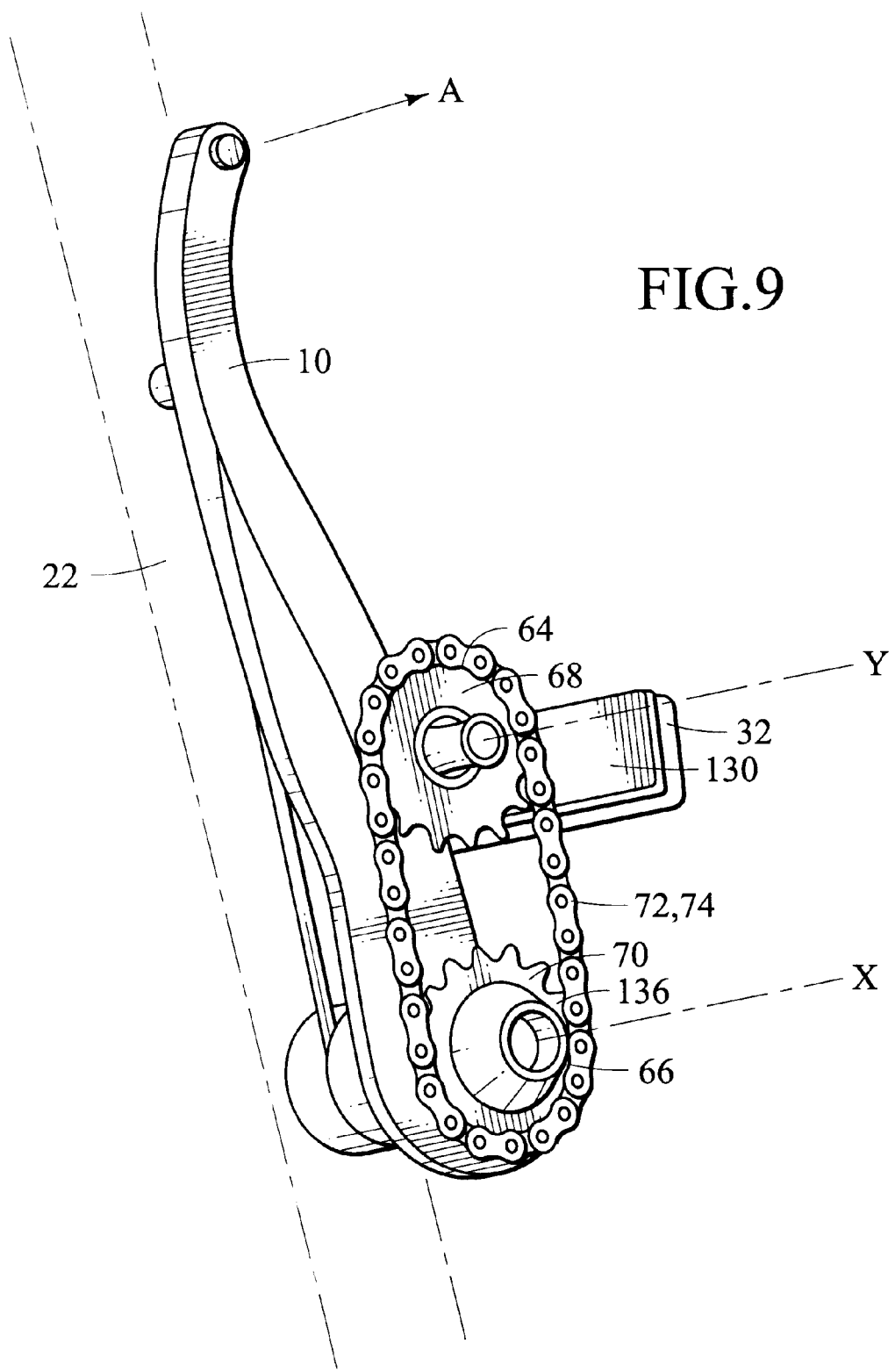
FIG. 9 is a perspective view of a geared embodiment of the invention using a chain linking member.
Figure 10:
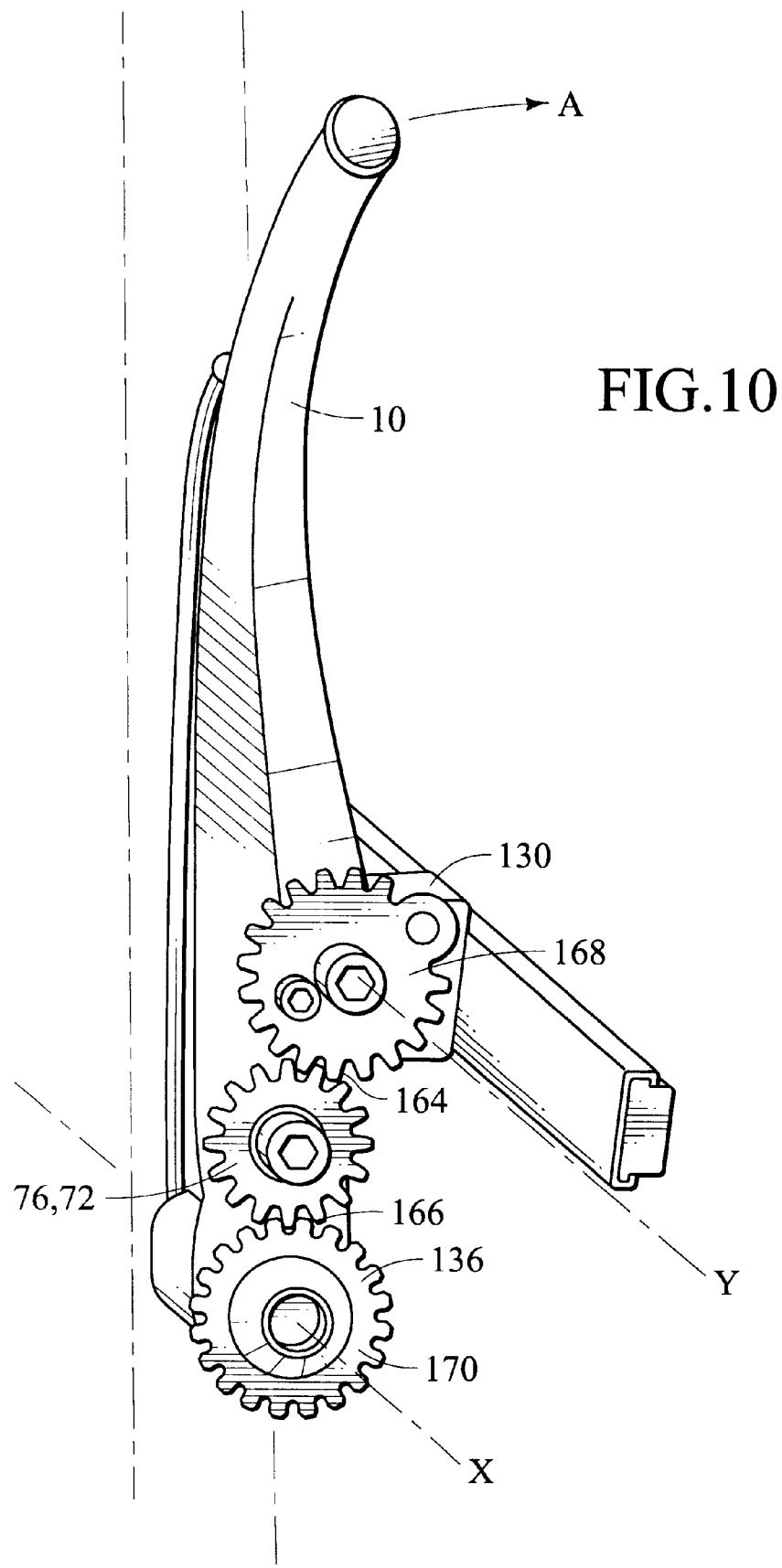
FIG. 10 is a perspective view of another geared embodiment of the invention using an interconnecting gear.
Figure 11:
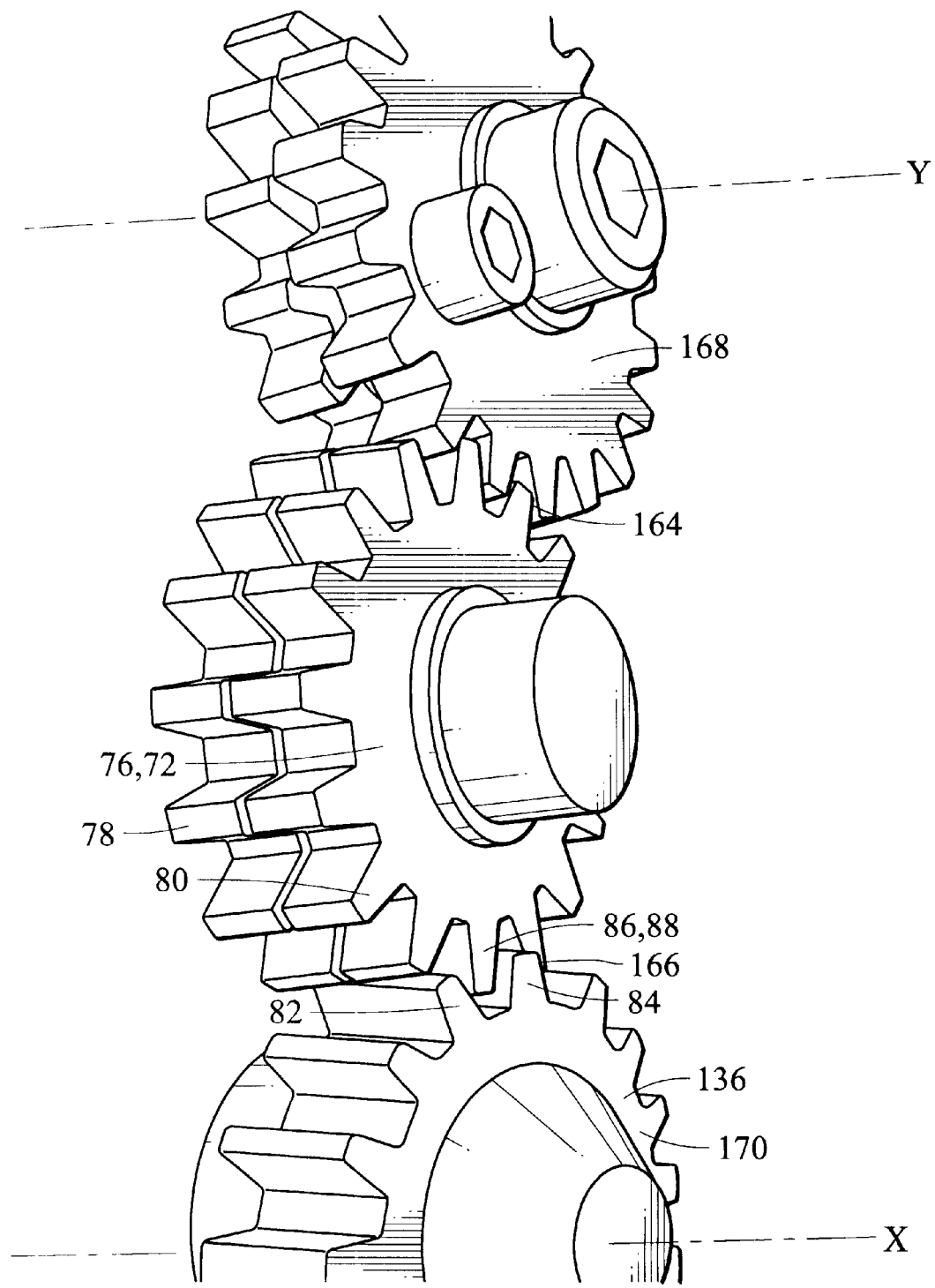
FIG. 11 is a partial detailed perspective view of the gear mechanism of the embodiment of FIG. 10.
Figure 17:
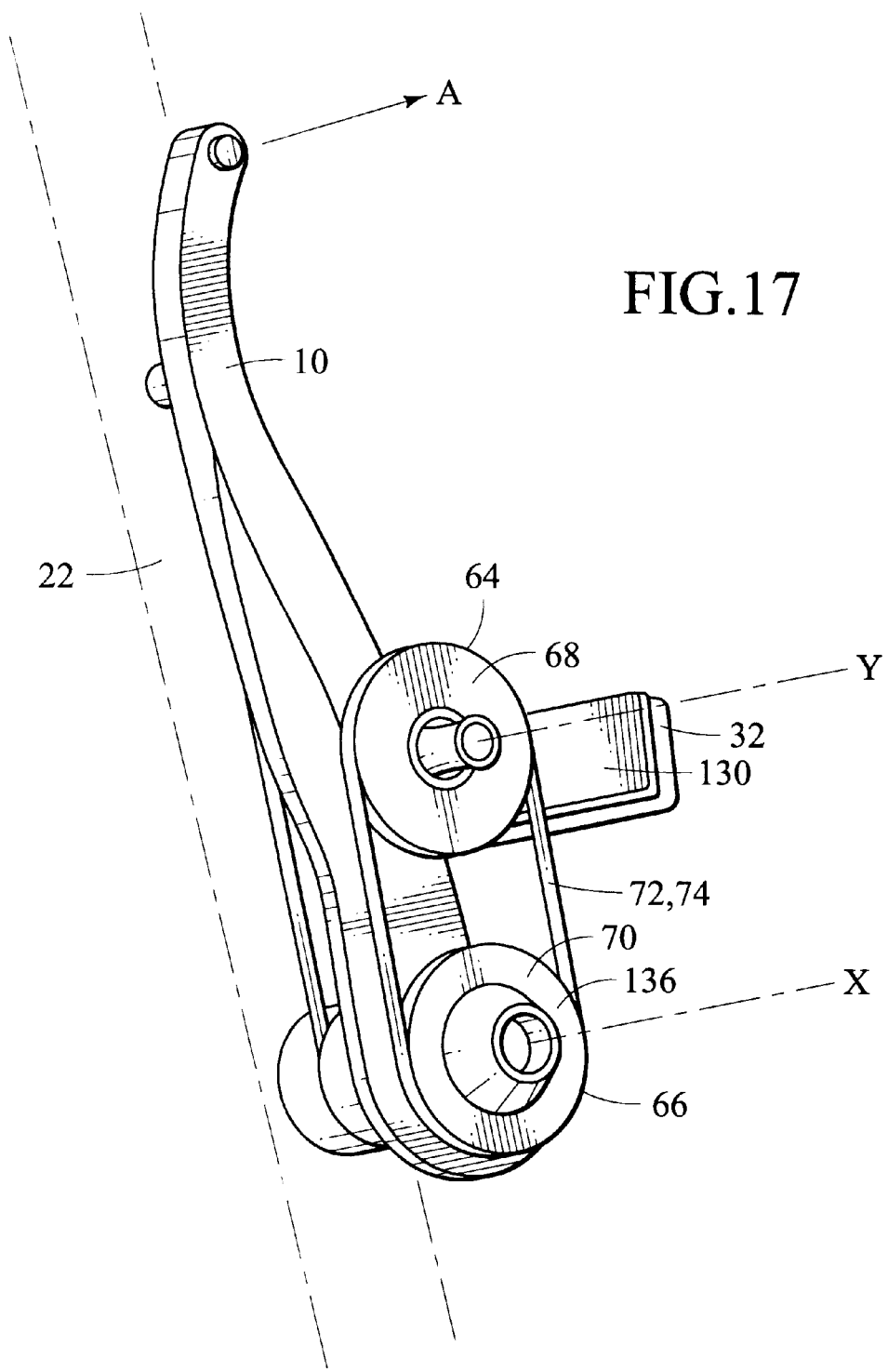
FIG. 17 is a perspective view of a geared embodiment of the invention using a belt linking member.
Figure 18:
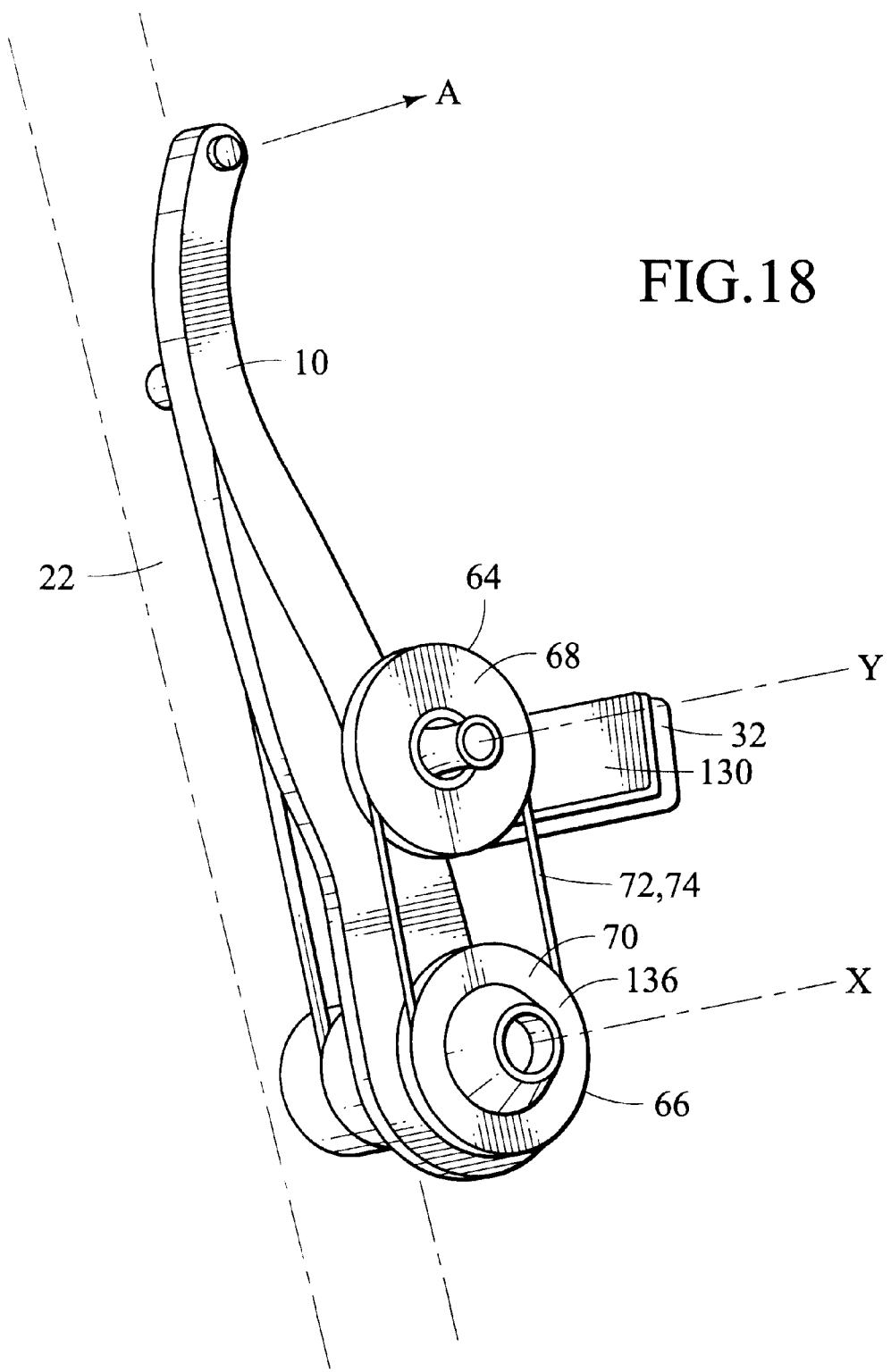
FIG. 18 is a perspective view of a geared embodiment of the invention using a cable linking member.

FIGS. 9–11 describe geared embodiments of the invention. In the embodiment of FIG. 9, the cam surface 38 of cam element 52 of the embodiment of FIG. 4 becomes a first engagement surface 64 disposed on a first gear 68. Like the cam element 52, the first gear 68 is fixed to a brake pad attachment member 130 pivotally attached to the brake arm 10. Additionally, the follower surface 40 of the urging member 36 of the embodiment of FIG. 4 becomes a second engagement surface 66 disposed on a second gear 70 fixed to the frame member 22. Whereas in the previous cammed embodiments, follower surface 40 is in direct bearing engagement with the cam surface 38, the first and second engagement surfaces 64, 66 are operatively connected by an interconnect member 72. In the embodiment of FIG. 9, interconnect member 72 is a flexible chain 74 looped about the first and second gears 68, 70. Alternatively, a belt (see FIG. 17) in frictional engagement with the gears 68, 70 or a cable (see FIG. 18) secured to the gears may also be used. The plug 98, described in FIG. 6, may likewise be used in these embodiments to properly tension the flexible interconnect member 72.

The operation of the embodiment of FIG. 9 remains similar to the previously described embodiments, resulting in the same substantially translational motion of the brake pad 32. Upon actuation of the brake arm 10, the fixed gear 136 displaces chain 74 which is in rolling engagement with the first gear 68 thereby imparting a corrective rotation to the brake pad attachment member 130 and ensuring that the brake pad 32 is displaced along a substantially translational path.

In the additional geared embodiment of FIG. 10, the interconnect member 72 takes the form of a third gear 76 rotatably connected to the brake arm 10 and is in rolling engagement with a first engagement surface 164 of a first gear 168 and a second engagement surface 166 of a second gear 170.

FIG. 11 is a detailed perspective view of the gear mechanism of the embodiment of FIG. 10. In multiple gear mechanisms, tolerance build-up or slop between the engaging teeth can be appreciable, especially under repeated use where the contour of the teeth become worn. To remedy this problem, a split-gear configuration is preferably used. Split-gears are used on the first and third gears 168 and 72. Third gear 76 includes first and second gear elements 78, 80, respectively, biased in opposite directions by a spring (not shown). Both gear elements 78 and 80 engage the second gear 170. Slop is eliminated by ensuring that the space between adjoining teeth 82, 84 of the second gear 170 is filled by oppositely biased teeth 86 and 88 (not shown) of gear elements 78, 80, respectively. A similar split-gear arrangement is used in the first gear 168 to remove slop between it and the third gear 76. In a three-gear mechanism, two of the three gears must use a split-gear configuration in order to eliminate slop from the entire mechanism.

Figure 12:
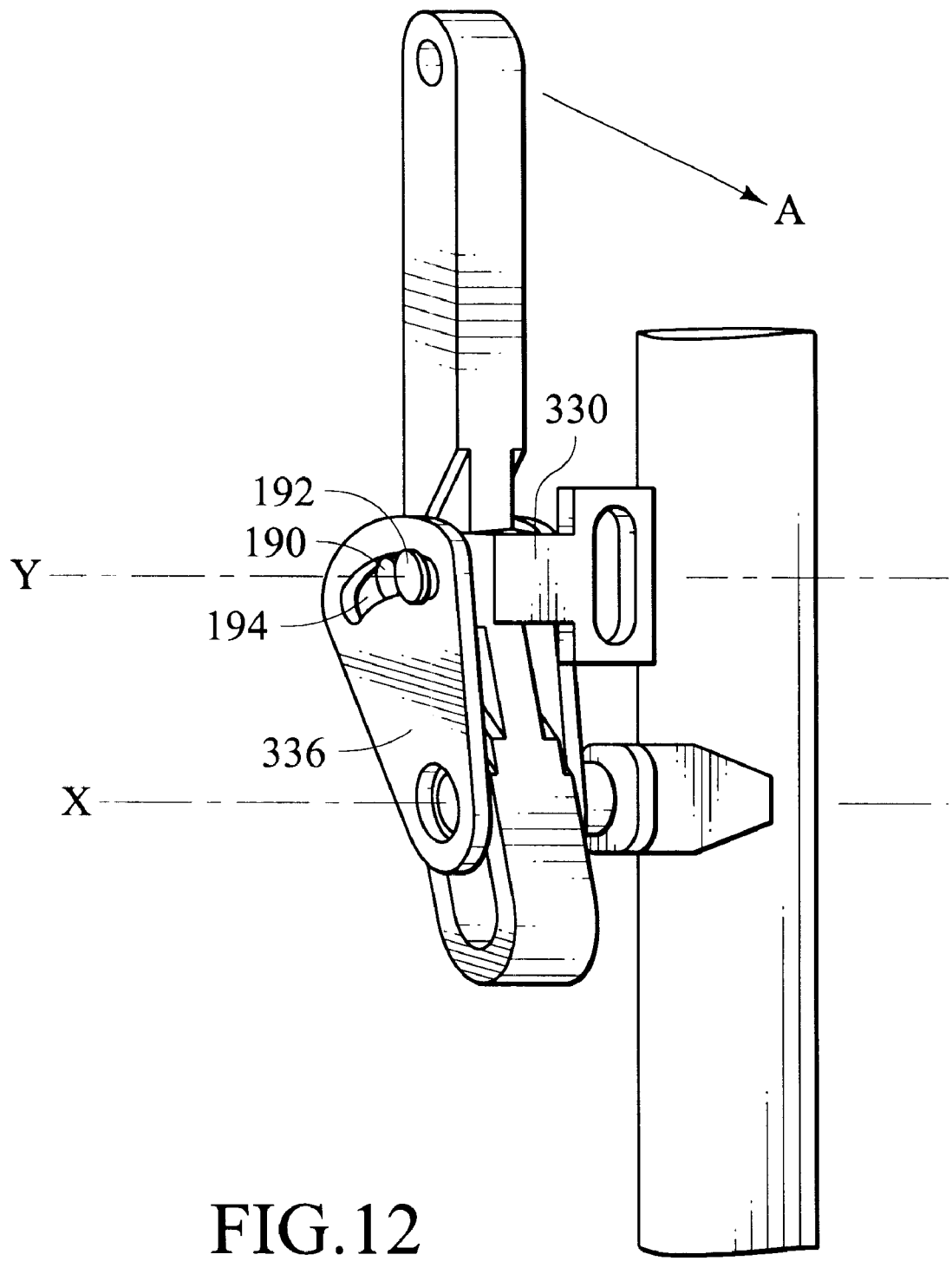
FIG. 12 is a perspective view of a slotted embodiment of the invention.
Figure 13:
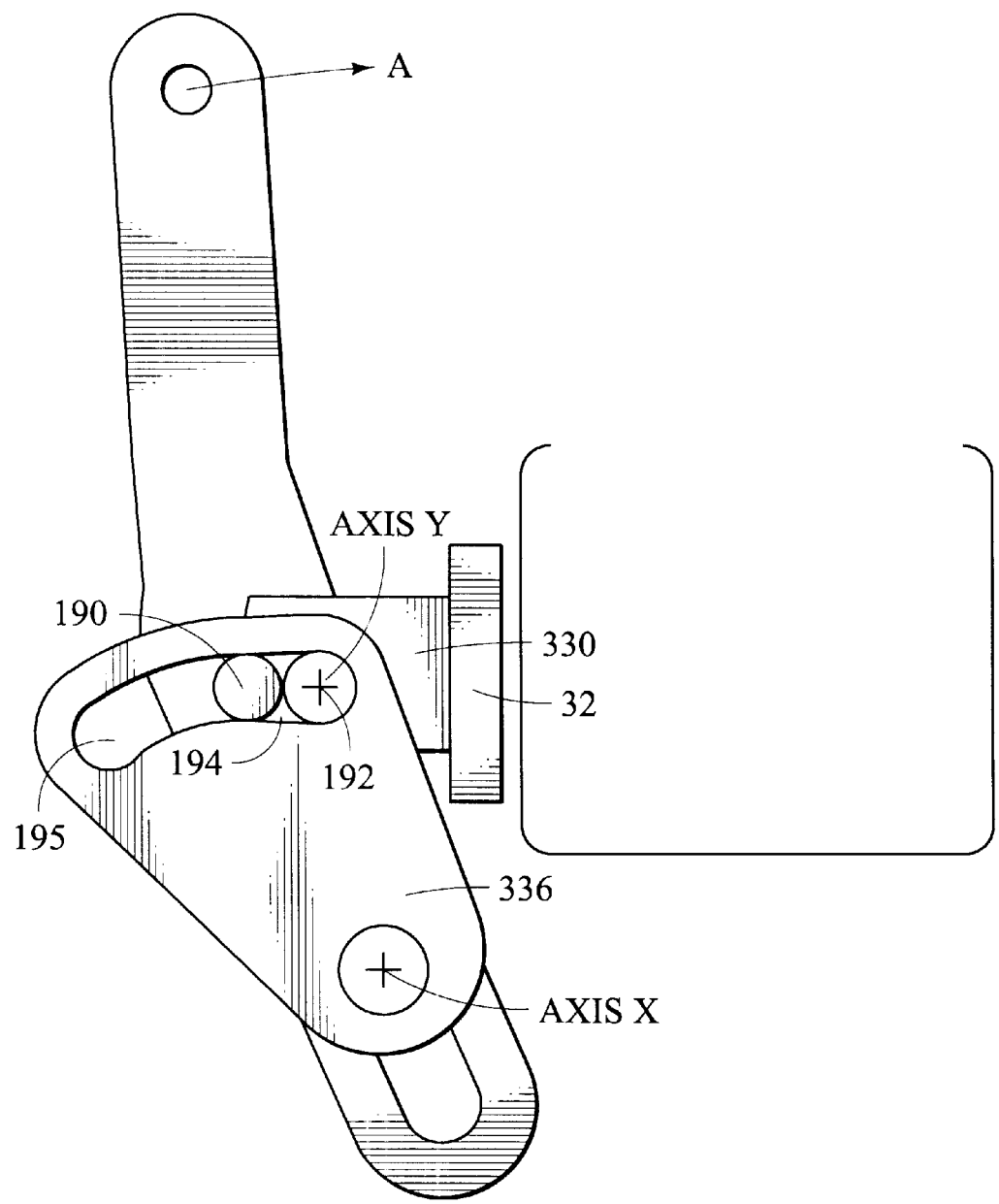
FIG. 13 is a front view of the embodiment of FIG. 12.
Figure 14:
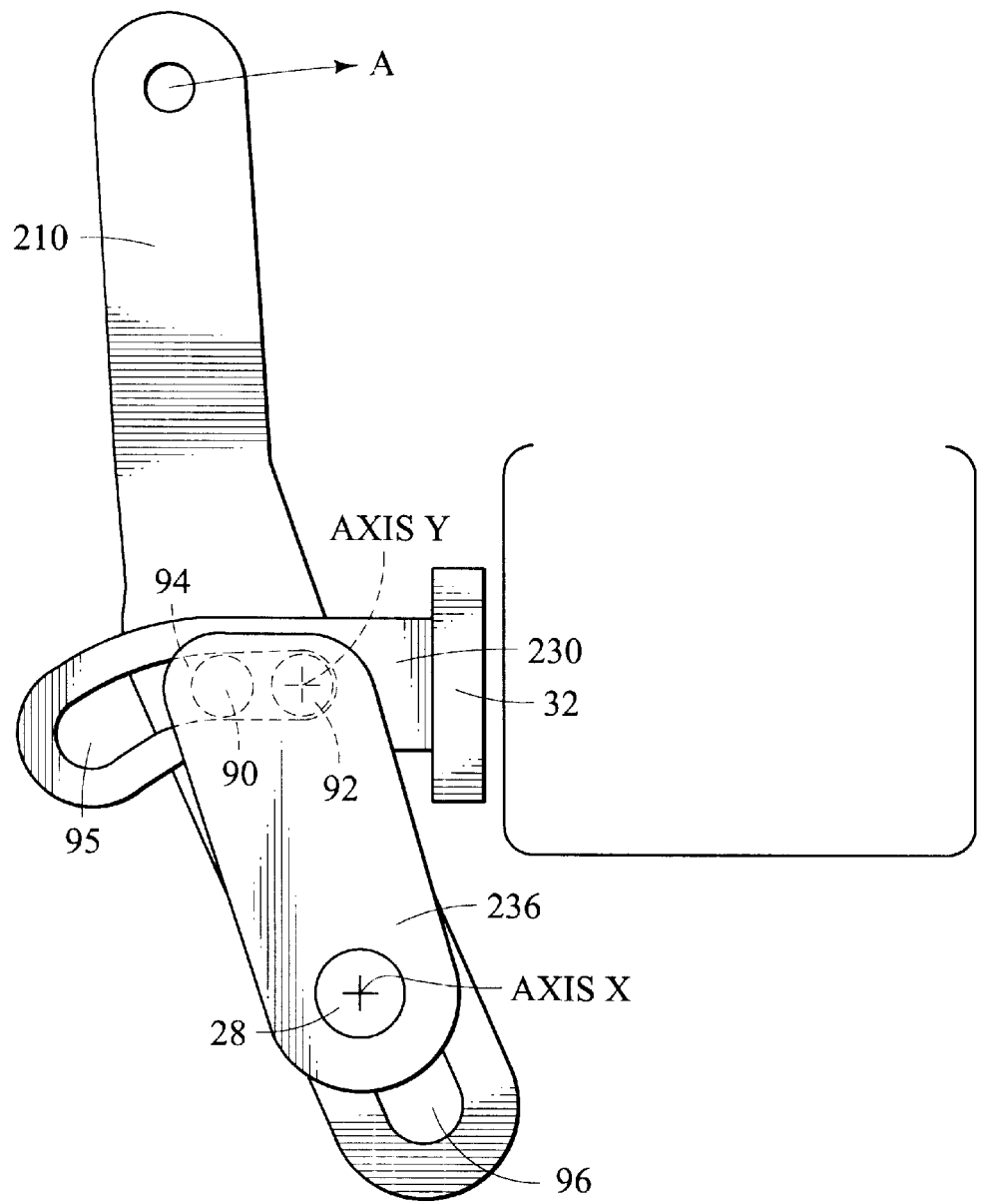
FIG. 14 is a front view of an additional slotted embodiment of the invention.

FIGS. 12–15 describe slotted embodiments of the invention. In the embodiment of FIG. 14, the first and second follower surface segments 46, 48, which track along cam surface 38 in the embodiment of FIG. 4, become first and second pin elements 90, 92 which track along a horizontal groove 94. Pin elements 90, 92 are fixed to an urging member 236 fixed to the frame member 22 at the brake boss 28. The horizontal groove 94 is formed in a brake pad attachment member 230 that is pivotally connected to a brake arm 210 along axis Y. The trailing end 95 of the groove 94 is curved to simply permit the brake pads 32 to be drawn apart sufficiently to permit wheel removal; this part of the groove 94 is not used during brake operation. The brake arm 210 is connected to the frame member 22 along a brake arm slot 96.

In operation, as brake arm 210 is deflected to the right under force A, pin elements 90, 92 track along horizontal groove 94 deflecting brake pad 32 along a substantially translational path. Pin elements 90, 92 serve to introduce a counterbalancing moment to brake pad attachment member 230, thereby maintaining its horizontal attitude. As the brake arm 210 is displaced to the right, it is also displaced vertically as brake boss 28 rides along the brake arm groove 96.

The slotted embodiment of FIGS. 12–13, merely interchanges the location of the groove 94 and the pins 90, 92 of the embodiment of FIG. 14. Groove 194 is relocated to the urging member 336, while pins 190, 192 are relocated to the brake pad attachment member 330 resulting in the same substantially translational motion of brake pad 32.

Figure 15:
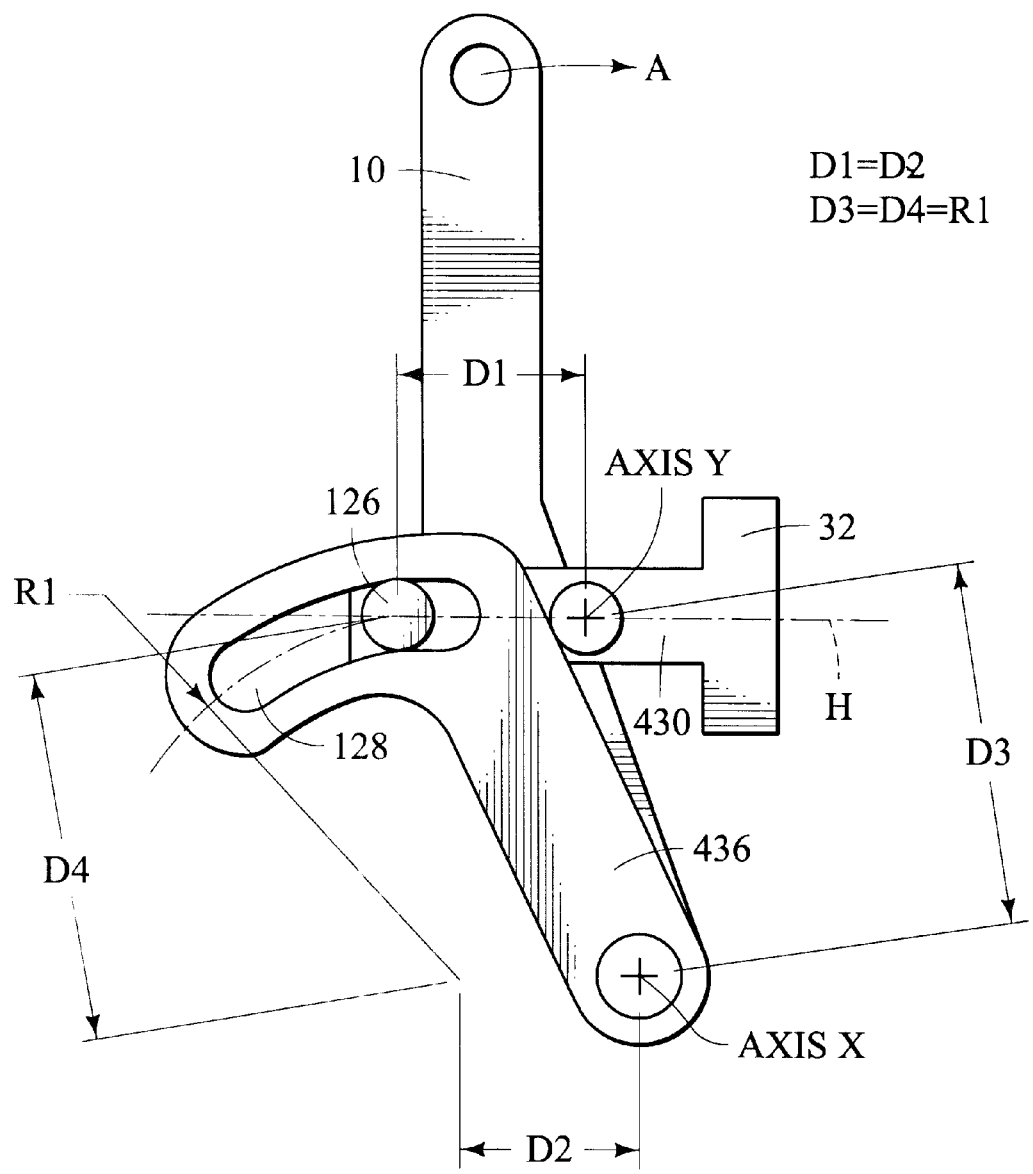
FIG. 15 is a front view of a further slotted embodiment of the invention.

FIG. 15 is a front view of an additional slotted embodiment of the invention. The brake arm 10 is hingedly connected to the frame member 22 (not shown in this Figures) at axis X. A brake pad attachment member 430 is hingedly connected to the brake arm 10 at axis Y and an urging member 436 is rigidly connected to the frame member 22 at the location of axis X. A pin 126 fixed to the brake pad attachment member 430 is configured to slide along a groove 128 located on the urging member 436 and having a constant radius R1. The centerpoint of pin 126 and axis Y form a horizontal datum line H. The groove 128 is defined using dimension D1, the distance between axis Y and the centerpoint of pin 126, and dimension D3, the distance between the X and Y axes, wherein D1=D2 and D3=R1. D2 locates the horizontal offset of the centerpoint of the radius R1 from the axis X.

Under brake actuation, as the brake arm 10 is deflected to the right, the pin 126 slides along the groove 128 thereby ensuring that brake pad 32 is deflected along a substantially translational trajectory.

Figure 16:
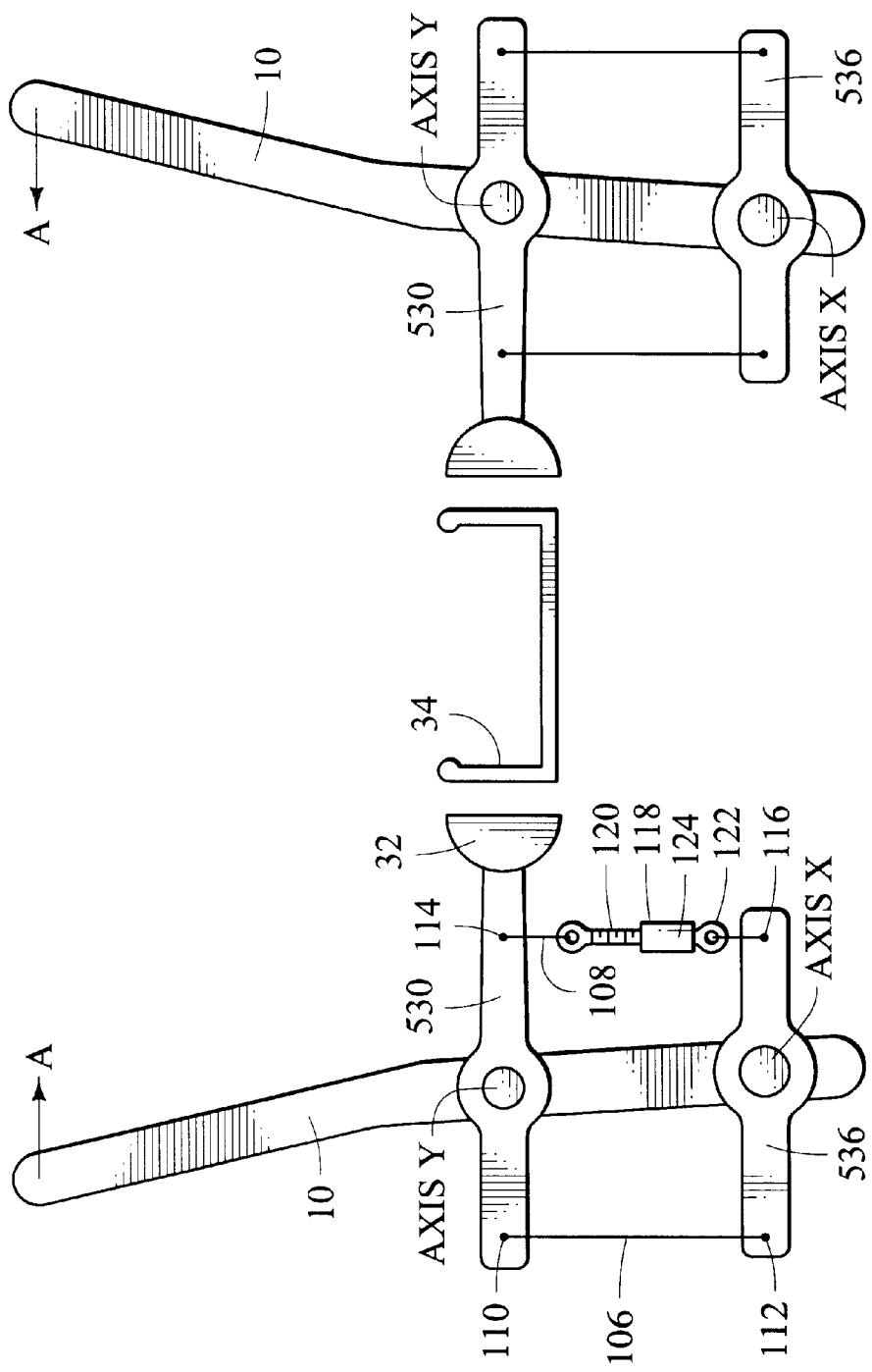
FIG. 16 is a front view of yet another embodiment of the invention.

FIG. 16 is a front view of yet another embodiment of the invention. The brake arm 10 is hinged at axis X to the frame member 22 (not shown). A brake pad attachment member 530 is hinged to the brake arm 10 at axis Y and an urging member 536 is rigidly connected to the frame 22 at the location of axis X. First and second tension members 106, 108 are located on either side of the brake arm 10 and are preferably of flexible construction. First tension member 106 is connected to brake pad attachment member 530 at pivot 10 and to the urging member 536 at pivot 112. Second tension member 108 is connected to brake pad attachment member 530 at pivot 114 and to the urging member 536 at pivot 116. It will be appreciated, however, that although tension members 106, 108 carry only tensile loads, they need not be of flexible construction. Furthermore, in order to remove any slack in the tension members 106, 108 and any tolerance build-up, a turnbuckle 118 is interposed along the length of one of the tension members 106, 108. The turnbuckle 118 includes three components: upper and lower attachment members 120, 122, and a rotatable portion 124 that threadably cooperates with both the attachment members 120, 122. The upper and lower attachment members are shown connected to the tension member 108. Twisting rotatable portion 124 draws the upper and lower attachment members 120, 122 toward each other thereby removing any slack in the assembly.

During brake actuation, as brake arm 10 is rotated toward the rim 34, the brake pad attachment member 530 is likewise displaced toward the rim, the tension members 106, 108 ensuring that attachment member 530 remains horizontal such that the trajectory of the brake pad 32 is substantially translational.

While the present invention has been described with respect to cantilever brake assemblies, it is equally applicable to other brake mechanisms. Accordingly, the present invention is not limited by the illustrated embodiments but by the scope and spirit of the claims which follow.

We claim:

1. A brake assembly, comprising:
    a brake arm pivotally connected to a bicycle frame member at a first end and actuated at a distal end;
    a brake pad attachment member pivotally connected to said brake arm at a first end and having a brake pad attached thereto at a distal end;
    an urging member fixed to the frame member;
    a cam surface disposed on a first one of said brake pad attachment member and said urging member; and
    a follower surface disposed on a second one of said brake pad attachment member and said urging member, said cam surface and said follower surface configured such that upon actuation of said brake arm said follower surface tracks along said cam surface.

2. The brake assembly of claim 1, wherein said brake pad attachment member is pivotally connected at its first end to an intermediate adjustment member attached to said brake arm, the adjustment member configured to be in locking engagement with said brake arm in a plurality of positions, each position shifting the location of the pivotal connection of the brake pad attachment member.

3. The brake assembly of claim 1, wherein said adjustment is a cylindrical plug having a central axis disposed in an aperture located in said brake arm, the pivotal connection of said brake pad attachment member is located eccentrically with respect to the central axis of said plug whereby rotation of said plug shifts the location of the pivotal connection of said brake pad attachment member.

4. The brake assembly of claim 1, wherein said cam surface includes first and
    second cam surface segments and said follower surface includes first and second follower surface segments, said first and second follower surface segments configured to track along said first and second cam surface segments, respectively.

5. A brake assembly, comprising:
    a brake arm pivotally connected to a bicycle frame member at a first end and actuated at a distal end;
    a brake pad attachment member pivotally connected to said brake arm at a first end and having a brake pad attached thereto at a distal end;
    an urging member fixed to the frame member;
    a first engagement surface formed on said brake pad attachment member proximate its first end;
    a second engagement surface formed on said urging member;
    an interconnect member in rolling engagement with said first and second engagement surfaces, said interconnect member and said first and second engagement surfaces configured such that upon actuation of said brake arm said interconnect member rotatably drives said first engagement surface.

6. The brake assembly of claim 5, wherein said interconnect member is of flexible construction.

7. The brake assembly of claim 6, wherein said flexible interconnect member includes a belt in frictional engagement with said first and second engagement surfaces.

8. The brake assembly of claim 6, wherein said flexible interconnect member includes a cable secured to said first and second engagement surfaces.

9. The brake assembly of claim 6, wherein said flexible interconnect member includes a chain and said first and second engagement surfaces include first and second toothed gear surfaces, respectively, said chain forming a closed loop about said first and second toothed gear surfaces.

10. The brake assembly of claim 5, wherein said first and second engagement surfaces comprise first and second toothed gears, respectively, and said interconnect member comprises a third toothed gear pivotally connected to said brake arm and configured to rotatably engage said first and second gears.

11. The brake assembly of claim 10, wherein two of said first, second and third gears is a split gear, each of said split gears having first and second halves, the first half being biased in a direction opposite to the second half.

12. A brake assembly, comprising:
    a brake arm pivotally connected to a bicycle frame member at a first end and actuated at a distal end;
    a brake pad attachment member pivotally connected to said brake arm at a first end and having a brake pad attached thereto at a distal end;
    an urging member fixed to the frame member;
    a first slot disposed on a first one of said brake pad attachment member and urging member;
    at least two pins disposed on a second one of said brake pad attachment member and said urging member, said pins and said slot configured such that upon actuation of said brake arm said pins slide along the slot.

13. The brake assembly of claim 12, wherein said slot is arcuate shaped.

14. The brake assembly of claim 12, wherein the attachment of said brake arm to the frame member is at a second slot and said first slot is configured to be substantially parallel to the substantially translational trajectory of said brake pad.

15. A brake assembly, comprising:
    a brake arm pivotally connected to a bicycle frame member at a pivot;
    a brake pad assembly pivotally connected to the brake arm at an axis spaced from the pivot, the brake pad assembly including a brake pad;
    a first of a cam surface and a follower surface made a part of the brake pad assembly; and
    a second of a cam surface and a follower surface affixed relative to the bicycle frame member, the cam surface and the follower surface in engagement such that upon actuation of the brake arm to pivot around the pivot, the follower surface tracks along the cam surface, displacing the brake pad along a substantially translational trajectory.

16. The brake assembly of claim 15, wherein said cam surface includes first and
    second cam surface segments and said follower surface includes first and second follower surface segments, said first and second follower surface segments configured to track along said first and second cam surface segments, respectively.

17. The brake assembly of claim 16, wherein the brake pad assembly moves outwardly and inwardly between an engaged position adjacent a bicycle wheel rim and a disengagement position spaced from the bicycle wheel rim, the first cam surface segment and the first cam follower surface segment disposed farther away from the wheel rim than the second cam surface segment and the second cam follower segment.

18. The brake assembly of claim 16, wherein the first and second cam surface segments are convexly arcuate.

19. The brake assembly of claim 16, wherein the shape of the first and second cam surface segments are substantially similar.

20. The brake assembly of claim 15, wherein the brake pad assembly includes a brake pad attachment member for attaching the brake pad to the brake arm.

21. The brake assembly of claim 15, wherein the pivot of the brake arm is disposed at a first end thereof, an actuating cable attachment disposed at a second end of the brake arm remote from the first end, said axis disposed intermediate the first and second ends of the brake arm.

22. A brake assembly, comprising:
- a brake arm pivotally connected to a bicycle frame member at a pivot;
- a brake pad assembly pivotally connected to the brake arm at a location spaced from the pivot, the brake pad assembly including a brake pad and a first engagement surface;
- a second engagement surface affixed relative to the bicycle frame member;
- an interconnect member in rolling engagement with the first and second engagement surfaces, said interconnect member and said first and second engagement surfaces configured such that upon actuation of said brake arm to pivot about the pivot, the interconnect member rotatably drives the first engagement surface to displace the brake pad along a substantially translational trajectory.

23. The brake assembly of claim 22, wherein the interconnect member is of flexible construction.

24. The brake assembly of claim 23, wherein the flexible interconnect member includes a belt in frictional engagement with said first and second engagement surfaces.

25. The brake assembly of claim 23, wherein said flexible interconnect member includes a cable secured to said first and second engagement surfaces.

26. The brake assembly of claim 23, wherein said flexible interconnect member includes a chain and said first and second engagement surfaces include first and second toothed gear surfaces, respectively, said chain forming a closed loop about said first and second toothed gear surfaces.

27. The brake assembly of claim 23, wherein the said brake pad assembly is pivotally attached to a slot located in said brake arm, the slot configured to permit sliding adjustment of said brake pad attachment member in order to tension said flexible interconnect member.

28. The brake assembly of claim 22, wherein said first and second engagement surfaces comprise first and second toothed gears, respectively, and said interconnect member comprises a third toothed gear pivotally connected to said brake arm and configured to rotatably engage said first and second gears.

29. The brake assembly of claim 28, wherein two of said first, second and third gears are split gears, each of said split gears having first and second halves, the first half being biased in a direction opposite to the second half.

* * * * *